May 7, 1963 W. H. PENN ET AL 3,088,310
GAS ANALYSER BASED ON THE PRINCIPLE OF THERMAL CONDUCTIVITY
Filed Aug. 20, 1959
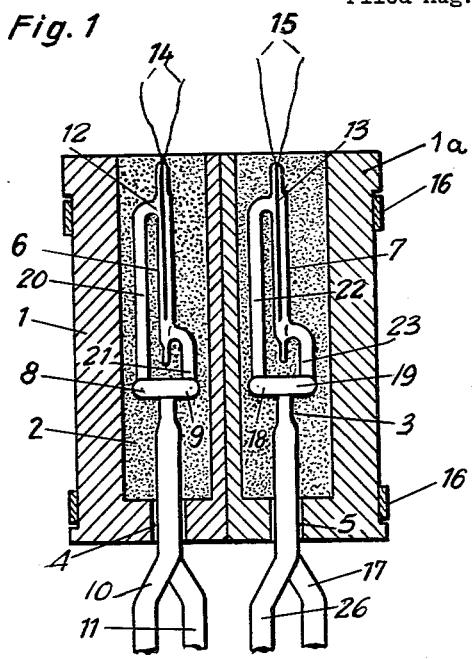
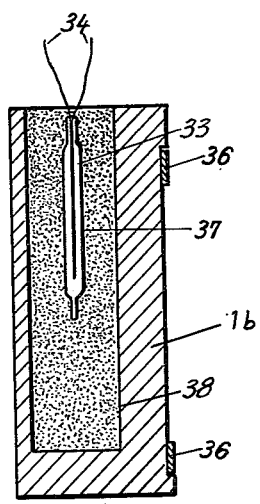
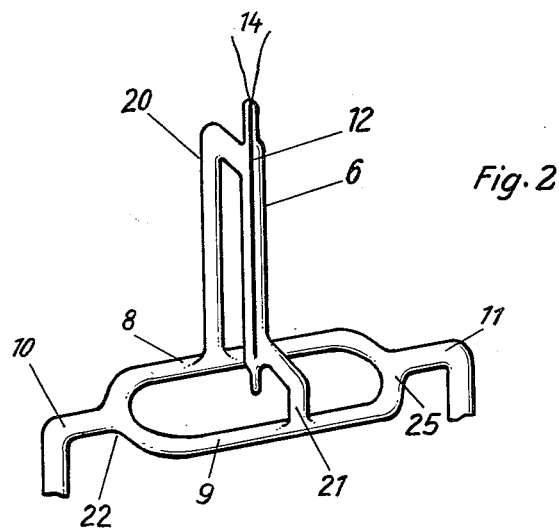

— 3,088,310
Patented May 7, 1963

3,088,310
GAS ANALYSER BASED ON THE PRINCIPLE OF THERMAL CONDUCTIVITY
Walter H. Penn, Frankfurt am Main, Wiesenau, and Friedrich G. Lotz, Hofheim, Taunus, Germany, assignors to Hartmann & Braun Aktiengesellschaft, Frankfurt, Germany, a corporation of Germany
Filed Aug. 20, 1959, Ser. No. 835,102
Claims priority, application Germany Aug. 26, 1958
1 Claim. (Cl. 73—27)

The invention relates to a gas analyser based on the principle of thermal conductivity. Such analysers generally consist of a measuring cell with the gas under test flowing through it and a reference cell filled with reference gas, a heating element, preferably a heating wire, being arranged in each cell. The heating wires are arranged in a bridge circuit for measuring the temperature difference due to the different thermal conductivity in the measuring and reference cell, this difference indicating the content of the component to be measured in the gas under test.

For gas analysers based on the principle of thermal conductivity it is well known that both cells, the measuring and the reference cell, can be of glass. This is advantageous because the current supply to the heating wires is sealed and therefore can be led out of the cells without necessitating special tightening. It is of special advantage to manufacture the measuring and reference cells of thermal gas analysers of glass if the reference cell is not fed with a flowing comparison gas but filled with sealed gas. When sealing the reference gas in the comparison cell the usual difficult sealing of the current supply leads can be avoided when using a glass cell. Sealings of the leads in glass can guarantee the purity of the sealed in gas for the required long periods.

Manufacturing the measuring and reference cells of thermal gas analysers of glass has in addition to the mentioned advantages considerable difficulties and, therefore, the known suggestions did not lead to actually useful industrial analysers. For achieving the absolutely required heat conduction or heat compensation, the glass measuring and reference cells had to be dipped into a common mercury bath which in case of an industrial analyser naturally causes difficulties restricting or even prohibiting the use of such an analyser. Although the mercury bath provides for good heat conduction at the walls of the cells, heat conduction of the bath to the ambiency is difficult since a metal container with good thermal conductivity hardly can be used for the mercury bath. Furthermore, such an arrangement for measuring higher temperatures, as in case of gas chromatography, is not suitable.

It has also been suggested to seal the measuring and reference cells in a metal block having a low fusion point. Experiments to realize such a design were not successful due to the different coefficients of thermal expansion and, consequently, also, this method is not of technical importance. To resist the forces exerted on the glass walls, the latter had to be reinforced to such an extent that their heat conduction was impaired. In both cases the electrical insulation of the lead-in wires was difficult and unreliable in service, thus reducing again the technical importance of this method. Due to these difficulties it was not possible to introduce glass as material for measuring and reference cells of thermal conductivity analysers.

The object of the invention is to provide a gas analyser based on the principle of heat conductivity and enabling the accurate and sensitive measurement of concentration. Another object of the invention is to provide a thermal conductivity analyser responding to the change of the percentage composition of the gas to be analysed with a very small time lag. A further feature of the invention is the use of material with good forming properties such as glass or quartz for the walls of the cells containing a heating element and through which the gas under test is flowing. Contrary to known equipment with glass measuring cells, a good heat conduction between the gas filling and the ambiency is ensured. Another object of the invention is to provide a reference system for the gas analysis for the thermal conductivity method with sealed-in reference gas which does not change even during long periods. A special object of the invention is also to provide a thermal conductivity analyser which will not be destroyed or deteriorate due to extended influence of corroding properties of the gas under test. This is achieved by selecting glass as material for the cells containing the heating element and by surrounding them by a tight packing of metal powder. For this purpose aluminum is used with preference which, if pulverized, has an adequate thermal conductivity, however it does not have an adverse electrically conductive effect due to the usual thin electrically insulating oxide layer on the powder grains. This considerably facilitates the insulation of the lead-in wires to the heating element. For ensuring sufficient heat exchange the metal powder surrounding the glass measuring and reference cell must be packed very tightly and it proved advantageous to provide for sedimentation of the metal powder in a metal container surrounding both cells using a liquid evaporable without residue. In this way an extremely tight packing of the metal powder surrounding the cells is obtained and this packing even does not become loose if subjected to vibrations and shocks, especially not if the sedimentation of metal powder is fixed to the surface by means of some binding agent. It is advantageous to surround the measuring and reference cells with a metal block the inside of which is adapted approximately to the shape of the cells and being a little larger, the space between the container and the cells being filled with the packing of metal powder. For measuring arrangements with thermostat control it is possible to select suitable dimensions for the space filled with metal powder in order to eliminate the effect of small temperature fluctuations due to switching on and off the heating current without influencing noticeably the measuring sensitivity. The glass cells covered by the invention may be very small, a feature which is of special advantage concerning the response time.

Methods of the invention are described in detail on basis of the drawings. FIG. 1 shows a gas analyser with two cells with gas to be tested flowing through one and reference gas flowing through the other cell. FIG. 2 shows constructional details of the measuring cell and FIG. 3 a portion of the gas analyser with reference gas sealed in the respective cell.

Two bores at 4, one behind the other, are provided through the bottom of the block 1. Glass capillary 6 is inserted in recess 2 provided in the block 1 which is of metal, the capillary being connected at the upper end to pipe 8 via line 20. The lower end of the vertically arranged capillary 6 is connected via lead 21 to pipe 9. Pipes 8 and 9 (vertical to the plane of FIG. 1) are connected with each other at both ends. Pipes 8 and 9 terminate with their front end in vertical line 10 and with the rear end in vertical line 11. Line 10 passes through bore 4 in the bottom of metal block 1, whereas line 11 passes through the rear bore in the bottom of block 1 not shown in the drawing. Within the vertically arranged glass capillary 6 a heating element is arranged which may consist of a heating wire shaped as a hair pin and with both wires insulated against each other. It is advantageous to use heating elements as described in Patent 2,866,330. The electric leads to heating element 6 are gastight sealed at the upper end of the capillary and designated in FIG. 1 with 14. Another metal block 1a is disposed in such a way that with its left plane surface it touches the right plane surface of metal block 1. Both metal blocks 1 and 1a are pressed against each other by screws and flaps 16, thus ensuring a perfect heat exchange between the metal blocks. Metal block 1a has also a recess 3. In this recess a vertical glass capillary 7 is inserted, connected at its upper end to line 22 and at its lower end to line 23. Line 22 leads to the horizontal short tube 18 and line 23 also to the horizontal pipe 19 (vertical to the plane of the drawing).

Pipes 18 and 19 terminate at their front end in a common vertical connection tube 26 and at the rear end together in the vertical connection tube 17. Connection tubes 26 and 17 pass through vertical bores in the bottom of metal block 1a, the bore with connection line 26 passing through it being shown in FIG. 1, and designated with 5. Within pipe 7 there is also a heating element 13 devised corresponding to the heating element 12 in pipe 6, the electric lead being designated with 15. The space between metal blocks 1 and 1a and glass capillaries 6 and 7 is filled with tightly packed metal powder, preferably aluminum powder. For introducing this aluminum powder in the space between the glass capillaries and metal blocks 1 and 1a the powder is packed tightly when combined with an evaporable liquid to form a stiff slurry. It can thus be inserted in opening 3 by filling the space between the glass leads and the pipes and the metal blocks. After evaporation of the liquid there remains a metal sedimentation with good heat conductance for conducting the heat from the walls of glass tubes 6 and 7 to metal blocks 1 and 1a. The prime function of the metal powder is to provide conduction of heat from the capillaries 6 and 7 to the block 1, and so the powder is, to all intents and purposes a metallic powder as far as heat transmission is concerned. The term metal or metallic powder herein means merely finely divided metal such as is available commercially without special treatment and remains as such during ordinary handling and use. Aluminum powder in ordinary form not only has properties of most metal powders, but because of normal contact with air, carries a thin (of molecular dimension) coating of oxide, so tenacious and continuous that under ordinary conditions atmospheric air is excluded from the metal proper. This oxide coating has a high dielectric constant and is, for its thickness, a good electrical insulator so long as it is not disturbed to expose the free metal below it. Consequently aluminum in powder form is not a good electrical conductor en masse for direct current especially and for this secondary reason aluminum powder is the preferred metallic powder, since the leads, say, 14 must be insulated from each other.

The fact that aluminum powder is preferable for its oxide film does not mean an appreciable oxide film is necessary if the leads 14 are well insulated, for the prime function of the powder is to conduct heat readily. Due to the good heat exchange the walls of pipes 6 and 7 are kept at a common temperature. FIG. 2 shows the vertical glass capillary with leads. The gas under test flows through vertical tube 10. At 22 tube 10 ends in two horizontal tubes 8 and 9 meeting at 25 and both ending in gas discharge tube 11. To tube 8 the connection tube 20 is connected, the latter connecting to the upper end of pipe 6 containing heating element 12. The lower end of pipe 6 containing heating element 12 is connected to pipe 9 via lead 21. By suitable selection of the point where tubes 20 and 21 end in tubes 8 and 9 the flow in vertical tube 6 containing the heating element can be adjusted to a favorable value. The arrangement with pipe 7 and heating element 13 installed in bore 3 of the metal block 1a corresponds entirely to the arrangement of FIG. 2.

FIG. 1 shows the arrangement with the gas under test flowing through tube 10 and afterwards passing through tubes 8 and 9 and partially tube 6 and flowing out through tube 11. Reference gas with a known constant coefficient of thermal conductivity enters through tube 26, passes tubes 18 and 19 and flows off partially through tubes 7 and 18. Both heating elements 12 and 13 are arranged in an electric bridge by means of leads 14 and 15, an indicator being inserted in the bridge diagonal. This instrument indicates the difference of the coefficient of thermal conductivity between the gas under test and the reference gas and consequently the content of $CO_2$ or hydrogen in the gas under test.

In some cases it is not necessary to conduct the reference gas through a measuring cell. For such applications the arrangement of FIG. 3 has been constructed using especially metal block 1 instead of metal block 1a. The overall dimensions and the external shape of metal block 1b shown in FIG. 3 are the same as those of metal block 1a shown in FIG. 1. Metal block 1b can replace metal block 1a. It can be fixed at metal block 1 of FIG. 1 by means of flaps 36. Metal block 1b also has a recess, however the bottom of metal block 1b is not fitted with a bore. In the recess of metal block 1b the vertically arranged tube 37 is inserted which is tightly sealed at the upper and lower end and which contains reference gas. In tube 37 heating element 33 is disposed corresponding as much as possible to heating elements 12 and 13 of FIG. 1 with respect to the thermal behaviour. The leads to this heating element are denoted with 34 in FIG. 3. The space between the internal wall of metal block 1b and tube 37 is filled with a tight packing of metal powder. Metal powder 38 is introduced in the recess of metal block 1b by sedimenting a certain quantity of metal powder by evaporation of a liquid. After evaporation of the liquid the residue is a tight and heat conducting packing of metal powder. Leads 34 connect the heating element 33 with heating element 12 for obtaining a measuring bridge and to measure the difference of heat conductivity between the gas under test in tube 6 and the reference gas sealed in tube 37.

We claim:

In a gas analyser for operation by thermal conductivity, a glass conduit for test gas having an inlet and outlet portion at each end and divided flow branches therebetween, an inverted somewhat U-shaped tube of glass having the terminal ends thereof connected to and in gas communication with the respective branches, a vertically disposed longitudinal heater element in said tube, a reference tube for reference gas and heater element therefor, metallic powder tightly packed about the tubes and conduit, and housing means for the powder to enable equalizing temperature of the tubes through the medium of the powder.

References Cited in the file of this patent

UNITED STATES PATENTS

| | | |
|---|---|---|
| 2,131,065 | Obermaier | Sept. 27, 1938 |
| 2,237,558 | Hutton | Apr. 8, 1941 |
| 2,685,203 | McEvoy et al. | Aug. 3, 1954 |
| 2,851,571 | Pearce | Sept. 9, 1958 |
| 2,866,330 | Axt et al. | Dec. 30, 1958 |
| 2,873,342 | Drugmand | Feb. 10, 1959 |